United States Patent [19]
Yamaguchi et al.

[11] Patent Number: 5,901,913
[45] Date of Patent: May 11, 1999

[54] FISHING REEL HAVING AN ARRANGEMENT FOR INDICATING WEAR OF A LINER

[75] Inventors: Nobuyuki Yamaguchi; Takeo Miyazaki; Hiroshi Toma, all of Tokyo, Japan

[73] Assignee: Daiwa Seiko, Inc., Tokyo, Japan

[21] Appl. No.: 08/786,901

[22] Filed: Jan. 23, 1997

[30] Foreign Application Priority Data

Jan. 31, 1996 [JP] Japan .................................. 8-082963

[51] Int. Cl.⁶ ................................................. A01K 89/00
[52] U.S. Cl. ........................ 242/268; 242/912; 116/208; 188/1.11 L; 43/17
[58] Field of Search .................................. 242/268, 912; 192/30 W, 4 R; 116/208, 67 R, 67 A; 188/1.11 W, 1.11 L; 43/16, 17, 17.5

[56] References Cited

U.S. PATENT DOCUMENTS

| | | | |
|---|---|---|---|
| 3,662,863 | 5/1972 | Dombeck | 116/208 X |
| 3,902,157 | 8/1975 | Kita et al. | 188/1.11 L X |
| 3,902,158 | 8/1975 | Dahlkvist | 188/1.11 L X |
| 4,005,766 | 2/1977 | Kennel | 116/208 X |
| 4,049,084 | 9/1977 | Beemer et al. | 192/30 W X |
| 4,174,024 | 11/1979 | Hagiwara | 192/30 W X |
| 4,201,974 | 5/1980 | Fima | 116/208 X |
| 4,266,633 | 5/1981 | Barabino et al. | 188/1.11 L |
| 4,422,402 | 12/1983 | Ogihara | 116/67 A |
| 4,604,604 | 8/1986 | Mann | 188/1.11 W X |
| 4,730,782 | 3/1988 | Young | 242/268 |
| 5,302,940 | 4/1994 | Chen | 188/1.11 L X |
| 5,339,928 | 8/1994 | Deit et al | 192/30 W X |
| 5,608,376 | 3/1997 | Ito et al. | 116/208 X |

FOREIGN PATENT DOCUMENTS

| | | | |
|---|---|---|---|
| 244926 | 10/1986 | Japan | 192/30 W |
| 244927 | 10/1986 | Japan | 192/30 W |
| 823694 | 4/1981 | U.S.S.R. | 192/30 W |
| 1576470 | 10/1980 | United Kingdom | 192/30 W |
| 2221269 | 1/1990 | United Kingdom | 188/1.11 L |

*Primary Examiner*—Donald P. Walsh
*Assistant Examiner*—Emmanuel M. Marcelo
*Attorney, Agent, or Firm*—Sughrue, Mion, Zinn Macpeak & Seas, PLLC

[57] ABSTRACT

In a fishing reel, a rotary body (a drive gear) has an accommodating section at the center which includes a round hole and a recess. The accommodating section accommodates the thick annular liner of a brake member in a brake device, and the detection brake body. The liner is made of felt, cork, leather or fiber-reinforced synthetic resin. The detection brake body is in the form of a disk, and is mounted on a shaft, which is a handle shaft. The bottom surface of the recess of the rotary body is formed into the uneven portion. The detection brake body has a through-hole, to which one end portion of the detecting piece is secured, for instance, by spot welding, and the other end portion of the detecting piece is extended so as to be engageable with the uneven portion. When the liner is worn out to a predetermined value, the detecting piece is contacted and engaged with the uneven portion to generate a sound.

19 Claims, 10 Drawing Sheets

FIG. 14

FISHING REEL HAVING AN ARRANGEMENT FOR INDICATING WEAR OF A LINER

BACKGROUND OF THE INVENTION

This invention relates to a fishing reel which detects when the liner of its brake member is worn to a predetermined value.

A conventional fishing reel is designed as follows: That is, in order to suitably tense the fishing line which is let out of the spool to fight against a fish which has taken the hook, the fishing reel has a drag device which is adapted to control a rotary body (rotor), which is rotated as the fishing line is let out. In the case of a double-bearing type fishing reel, as is disclosed by Japanese Utility Patent (OPI) No. 68774/1978 (the term "OPI" as used herein means an "unexamined published application"), the drag device is constructed by frictionally coupling a drive gear mounted on the handle shaft and engaged with a pinion rotated together with a spool.

During fishing, the fishing line is pulled to tense it. If this operation is frequently carried out, then the liner of a brake member forming the brake device becomes worn out, as a result of which the range of adjustment is made narrow, or the powder of the lining material sticks on the braking surface or the driving section, to lower the drag performance. In practice, it is difficult to accurately detect how the drag performance is lowered; that is, in order to accurately detect this deterioration and replace the lining washer it is necessary to disassemble the reel.

SUMMARY OF THE INVENTION

In view of the foregoing, an object of the invention is to provide a fishing reel which has means for indicating when the liner of the brake member is worn to a predetermined value, without disassembling the reel.

The foregoing object of the invention has been achieved by the provision of a fishing reel comprising a brake device which frictionally couples a rotary body, which is turned as a fishing line is let out, to a shaft body in such a manner that the rotary body is rotatable, and has an adjusting body adapted to adjust the frictional coupling force of the rotary body, which, according to the invention, further comprises: alarming means for causing detecting means to detect when the liner of a brake member adjusting the frictional engagement is worn to a predetermined value, to give an alarm.

When, with the clutch mechanism in "on" state, the fishing line is let out, and drags and slips from the pulling force of the fish taking the hook, the spool is turned against the drag brake force. This drag brake force is adjusted by the adjusting body which is a drag adjusting knob adapted to adjust the frictional coupling force of the liner of the brake member of the brake device in the rotary body, which is made up of the drive gear.

If the operation that the fishing line is pulled out while being tensed is frequently carried out during fishing, then, the liner becomes worn, as a result of which the range of adjustment is decreased. Eventually the powder of the liner thus worn sticks onto the brake surface or the drive section, thus lowering the drag performance. When the liner is worn, the position of the detection brake body shifts axially. When the liner is worn to a predetermined value, the other end portion of the detecting piece of the alarming means, which is secured to the detection brake body and serves also as detecting means, is engaged with the uneven portion of the alarming means which serves as the detecting means for the bottom surface of the uneven portion of the rotor. Hence, as the rotary body turns, a detection sound is produced.

When the detection sound is produced, the reel is disassembled to replace the liner with a new one. That is, the liner can be replaced with a new one before the powder of the liner thus worn sticks onto the brake surface or the drive section to greatly lower the drag performance.

DETAILED DESCRIPTION OF THE PREFERRED EMBODIMENTS

Preferred embodiments of this invention will be described with reference to the accompanying drawings.

First Embodiment

Figure 1:
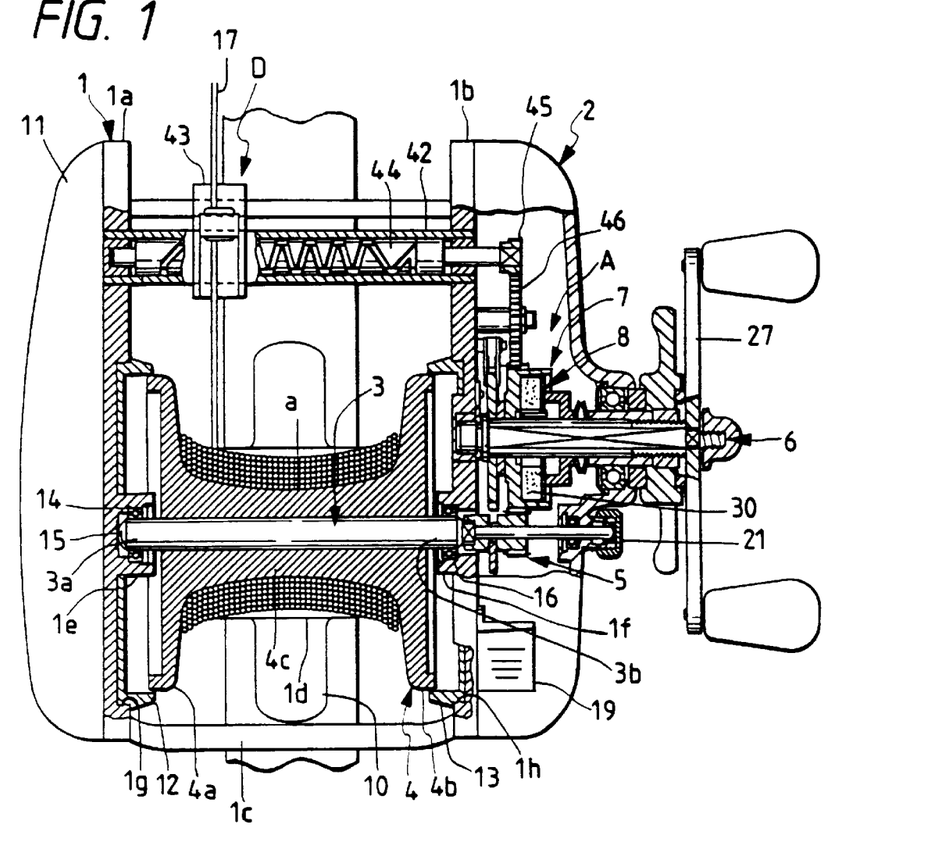
FIG. 1 is a sectional plan view showing essential components of a double-bearing type fishing reel, which constitutes a first embodiment.
Figure 2:
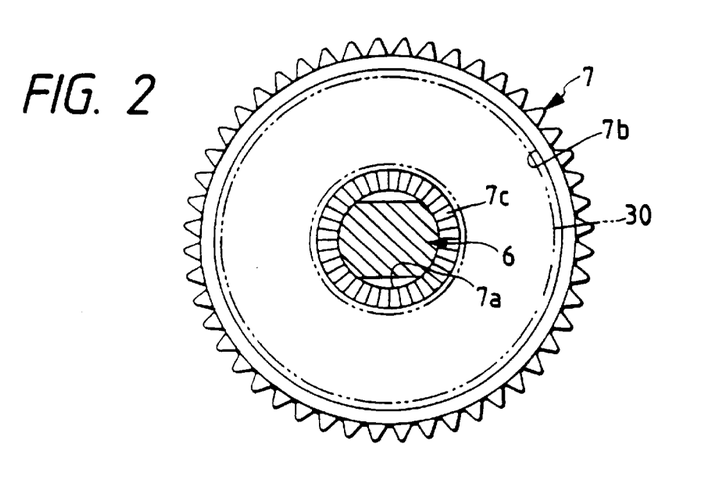
FIG. 2 is a plan view of a rotary body in the fishing reel.
Figure 3:
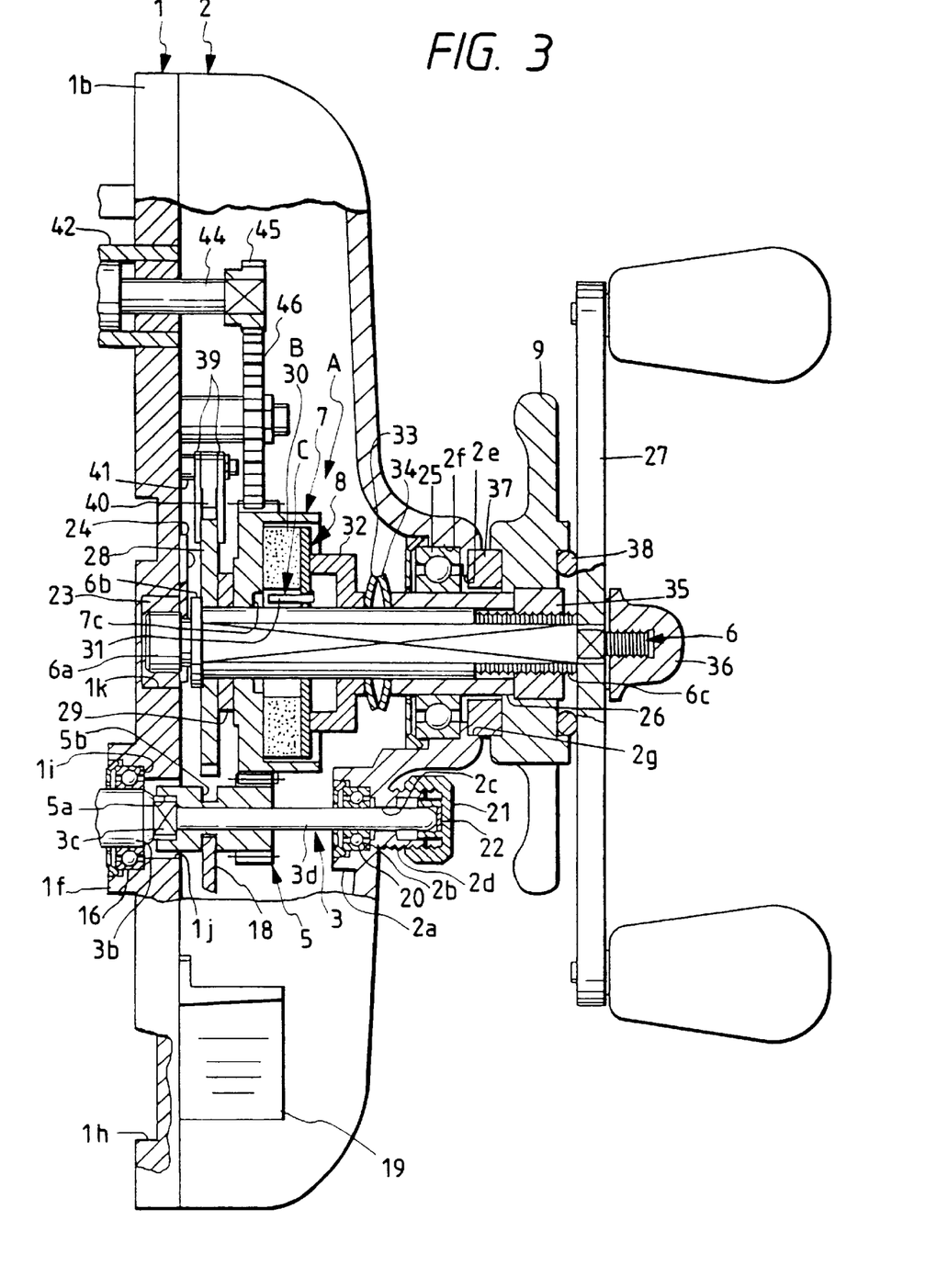
FIG. 3 is an enlarged plan view, with parts cut away, showing essential components, on the side of the handle, of the fishing reel.
Figure 4:
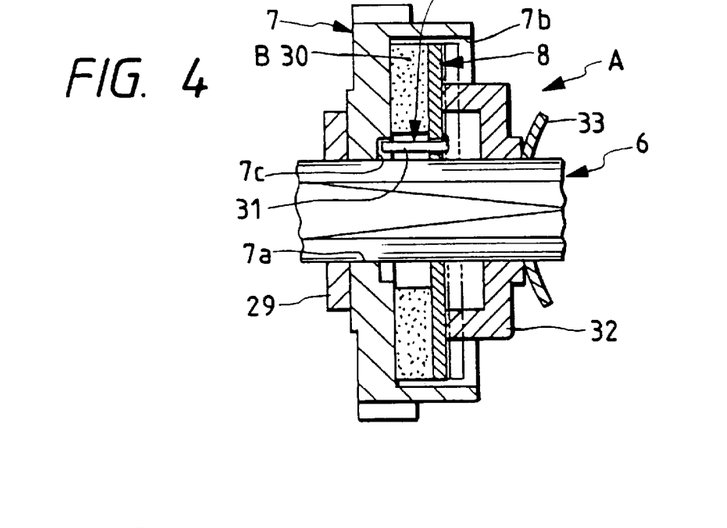
FIG. 4 is an enlarged side view, with parts cut away, of the rotary body which is in operation.

FIGS. 1 through 4 show an example of a fishing reel, which constitutes a first embodiment of the invention. More specifically, FIG. 1 is a plan view, with parts cut away, showing essential components of an example of a double-bearing type fishing reel, FIG. 2 is a plan view of a rotary body (rotor) in the fishing reel, FIG. 3 is an enlarged plan view, with parts cut away, showing essential components, on the side of the handle, of the fishing reel, and FIG. 4 is an enlarged side view, with parts cut away, of the rotary body which is in operation.

The double-bearing type fishing reel is designed as follows: The right and left side frames 1b and 1a of a reel body 1 are held in parallel by a supporting bar 1c and a fixing board 1d adapted to fix a reel leg 10, and reel side boards 11 and 2 are provided outside the right and left side frames 1b and 1a, respectively.

Cylinders 1e and 1f are formed on the inner surfaces of the right and left side frames 1b and 1a, respectively.

Recesses 1g and 1h are formed outside the cylinders 1e and 1f, respectively, and spool covers 12 and 13 are fitted in those recesses 1g and 1h, respectively.

A bearing 14 is fitted in the cylinder 1e, thus supporting one end portion 3a of a spool shaft 3, and a thrust bearing 15 is fixedly provided on the inner surface of the bottom of the cylinder 1e in such a manner that it is abutted against the end portion 3a of the spool shaft 3.

On the other hand, the cylinder 1f has a recess 1i and a through-hole 1j, and a bearing 16 is fitted in the recess 1i to support the other end portion 3b of the spool shaft 3.

A spool 4 is fixedly mounted on the spool shaft 3 in such a manner that it is located between the right and left side frames 1b and 1a, and is freely rotatable.

The spool 4 comprises right and left flanges 4b and 4a, and a line winding barrel 4c on which a fishing line 17 is wound. The line winding barrel 4c has a cylindrical surface a which is gradually larger in diameter towards the flanges 4a and 4b.

The spool shaft 3 has an engaging portion 3c and a small-diameter portion 3d on the side of the reel side board 2. The engaging portion 3c and the small-diameter portion 3d are inserted into the through-hole 1j and protrude on the side of the reel side board 1.

A pinion 5 is mounted on the small-diameter portion of the spool shaft 3 between the right side frame 1b and the reel side board 2 in such a manner that it is axially slidable. The engaging portion 3c of the spool shaft 3, and the engaging portion 5a of the pinion 5 form the engaging section of a clutch mechanism.

The pinion 5 has an annular groove 5b, in which a clutch board 18 is inserted. The clutch board 18 is operated with a clutch lever 19.

The reel side board 2 has a cylinder 2a, a recess 2b, and a through-hole 2c. A cylindrical shaft 2d protrudes on the right side of the recess 2b.

A bearing 20 is fitted in the recess 2b, thus supporting the other end portion of the small-diameter portion 3d.

The cylindrical outer surface of the shaft cylinder 2d is male-threaded, and an adjusting knob 21 for adjusting the pressure at the end of the spool shaft is threadably mounted on the shaft cylinder 2d. The adjusting knob 21 is cup-shaped, and a thrust bearing 22 is fixedly fitted in the bottom of the adjusting knob, in such a manner that the end of the small-diameter portion 3d abuts against the thrust bearing 22.

The right side frame 1b has a recess 1k in the outer surface, in which a bearing 23 is fitted. One end portion 6a of a shaft 6, which is a handle shaft, is rotatably engaged with the bearing 23, and is prevented from being removed therefrom by means of a retaining board 24.

The reel side board 2 has a through-hole 2e and a recess 2f, in which a bearing 25 is fitted.

With the aid of the bearing 25, the shaft 6, which is the handle shaft, is supported through a collar 26 axially-movably and non-rotatably mounted on the shaft.

A drive gear, namely, a rotary body 7 is mounted on the shaft body 6. The rotary body 7 is engaged with a pinion 5. Thus, the spool 4 is turned through the rotary body 7 with a handle 27.

On the left side of the rotary body 7, the shaft body 6 has one end portion 6a and a flange 6b, and a reverse-rotation preventing ratchet wheel 28 is fixedly mounted on the shaft 6 in such a manner that it is pushed against the flange 6b.

A friction board 29 is set between the rotary body 7 and the ratchet wheel 28.

The rotary body 7 has an accommodating section at the center which is made up of a round hole 7a and a recess 7b. The accommodating section accommodates the liner 30 of a brake member B in a brake device A, and the detection brake body 8 of alarming means C which serves also as detecting means.

The detection brake body 8 is in the form of a disk, and is mounted on the shaft body 6 in such a manner that it is prevented from being rotated.

The alarming means C has an uneven portion 7c in the bottom of the recess 7b of the rotary body 7.

The detection brake body 8 has a through-hole to which one end portion of a detecting piece 31 of the alarming means (serving also as the detecting means) is fixedly secured, for instance, by spot welding.

The other end portion of the detecting piece 31 is extended in such a manner that it engages with the uneven portion 7c.

The liner 30 is made of felt, cork, leather, fiber-reinforced synthetic resin, or the like, and is in the form of a ring relatively large in thickness.

On the side of the opening of the rotary body 7, a pressing board 32 which is mounted on the shaft body 6 in such a manner that it is prevented from being rotated is pressed against the detection brake body 8.

Springs 33 and 34 are mounted on the shaft body 6 in such a manner that they prevented from being turned, are and press against the right side of the pressing board 32.

The spring 34 is abutted against the aforementioned collar 26.

The collar 26 is abutted against a nut 35 which is threadably engaged on a threaded portion 6c of the shaft body 6.

Outside the nut 35, the handle 27 is fixedly mounted on the shaft 6 in such a manner that it is prevented from being turned around the shaft 6 and it is retained with a cap nut 36.

The nut 35 is fitted in a polygonal through-hole formed in an adjusting body 9, which is a drag adjusting knob adapted to adjust the frictional coupling force of the rotary body 7, in such a manner that it is axially movable back and forth.

The reel side board 2 located outside the bearing 25 supporting the shaft body 6 has a recess 2g in its side portion. An intermediate member 37 of metal, synthetic resin or hard felt material is interposed between the recess 2g and the aforementioned adjusting body 9. Another intermediate member 38, which is an O-ring, is interposed between the adjusting body 9 and the handle 27.

The aforementioned reverse-rotation preventing ratchet wheel 28 is mounted on the shaft body 6 in such a manner that the former 28 is prevented from being turned around the latter 6. Outside the ratchet wheel 28, a reverse-rotation preventing pawl 40 held between spring boards 39 and 39 is rotatably mounted on a shaft 41. The ratchet wheel 28 is clamped by the spring boards 39 and 39, and the end portion of the pawl 40 is so extended as to be engageable with the locking teeth of the ratchet wheel 28.

A guide cylinder 42 of a level winding device D is provided between the two side frames 1a and 1b and in front of the spool in such a manner that the guide cylinder 42 is prevented from being rotated, and a fishing-line guide 43 is mounted on the guide cylinder 42 in such a manner that it is movable right and left.

The fishing-line guide 43 reciprocates right and left in association with the rotation of the handle 27 through a traverse cam shaft 44 in the guide cylinder 42, a small gear 45, an intermediate gear 46, and the rotary body 7.

The double-bearing type fishing reel thus designed operates as follows.

The rotary body 7, which is the drive gear, is frictionally coupled to the shaft 6, which is the handle shaft, through the liner 30 of the brake member B in the brake device A. The drag brake force is adjusted with the adjusting body 9 which is the drag adjusting knob adapted to adjust the frictional coupling force.

When the handle 27 is turned with the clutch mechanism in the "on" state, so that the engaging section 3c of the spool shaft 3 is engaged with the engaging section 5a of the pinion 5, the spool 4 is turned through the rotary body 7, the pinion 5, and the spool shaft 3, so that the fishing line 17 is wound on the spool 4.

As the handle 27 is turned, a traverse cam shaft 44 is turned, so that the fishing-line guide 43 is reciprocated along the guide cylinder 42.

As the fishing line guide 43 is reciprocated in the above-described manner, the fishing line 17 is wound parallel on the spool 4.

When the fishing line 17 is let out of the spool 4, the traverse cam shaft 44 turns in association with the rotation of the spool 4, so that the fishing-line guide 43 reciprocates along the guide cylinder 42.

When the fishing line 17 is let out of the spool 4 with the clutch mechanism placed in "off" state by the operation of the clutch lever 19, the spool 4 is turned with the fishing-line guide 43 at rest.

When, with the clutch mechanism in "on" state, the fishing line is let out being dragged and slipped by the pulling force of the fish taking the hook, the spool 4 is turned against the drag brake force adjusted by the adjusting body 9, the adjusting body 9 being a drag adjusting knob adapted to adjust the frictional coupling force of the liner 30 of the brake member B of the brake device A in the rotary body 7 made up of the drive gear.

If the operation that the fishing line 17 is pulled out while being tensed is frequently carried out during fishing, then the liner 30 becomes worn, as a result of which the range of adjustment is decreased. Eventually, the powder of the liner 30 thus worn out sticks onto the brake surface or the drive section, thus lowering the drag performance. As the liner 30 becomes worn, the detection brake body 8 shifts axially towards the rotary body 7; more specifically, when the liner 30 is worn to a predetermined value, the other end portion of the detecting piece 31 of the alarming means C (which is secured to the detection brake body and serves also as the detecting means) engages with the uneven portion 7c of the alarming means C which serves as the detecting means on the bottom surface of the recess portion 7b of the rotary body 7. Hence, as the rotary body 7 turns, a detection sound, such as a mechanical click sound, is produced.

When the detection sound is produced, the reel may be disassembled to replace the liner 30 with a new one. That is, the liner 30 can be replaced with a new one before the powder of the liner 30 thus worn out sticks onto the brake surface or the drive section to greatly deteriorate the drag performance.

The above-described first embodiment may be modified as follows:

The uneven portion of the alarming means (which serves also as the detecting means) is provided at the edge of the opening of the rotary body 7 which is made up of the drive gear. The detection brake body 8 is formed convex in section, and the detecting piece of the alarming means C is provided on the outer periphery so as to be engageable with the uneven portion.

Second Embodiment

Figure 5:
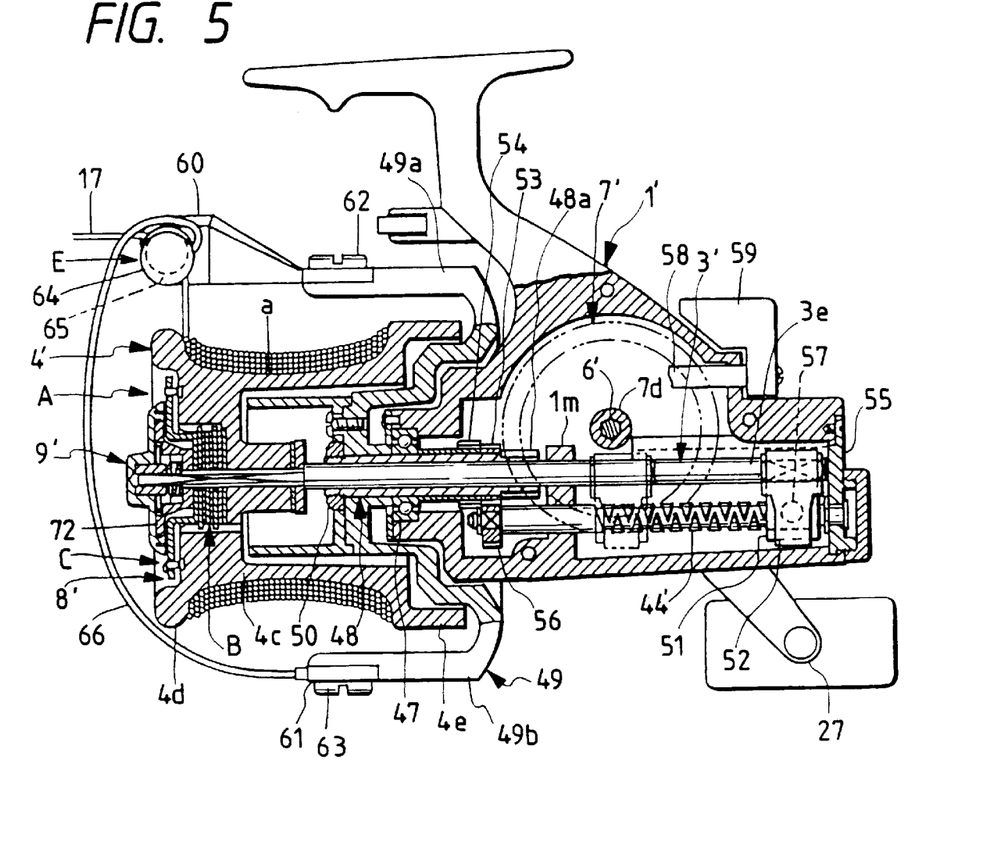
FIG. 5 is an enlarged sectional side view showing essential components of a fishing spinning reel, which constitutes a second embodiment of the invention.
Figure 6:
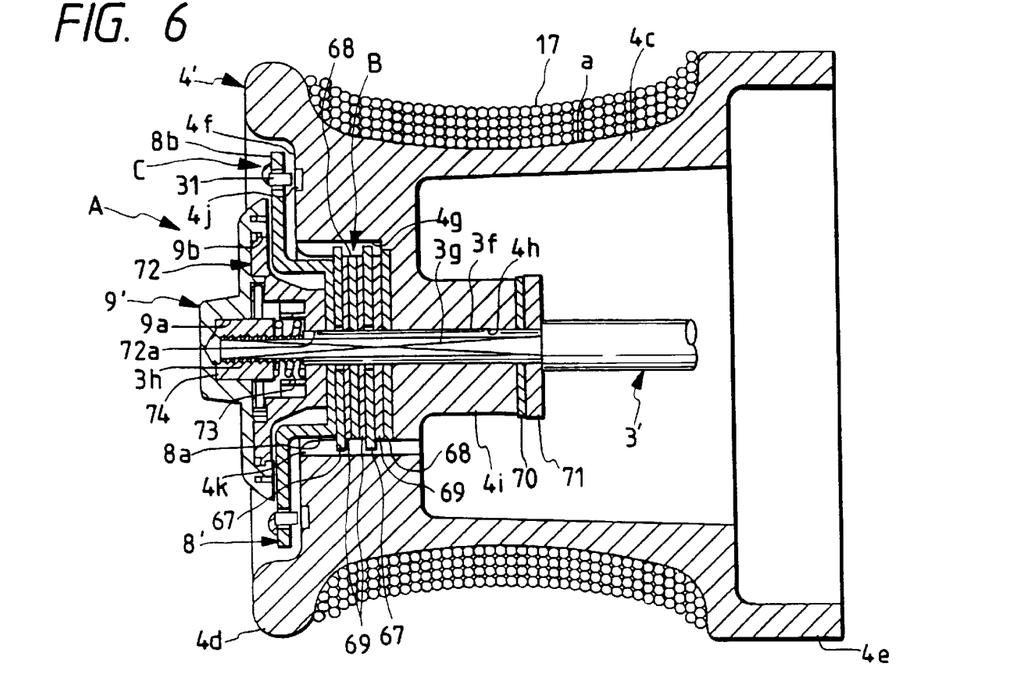
FIG. 6 is an enlarged sectional side view of the spool of the fishing spinning reel shown in FIG. 5.
Figure 7:
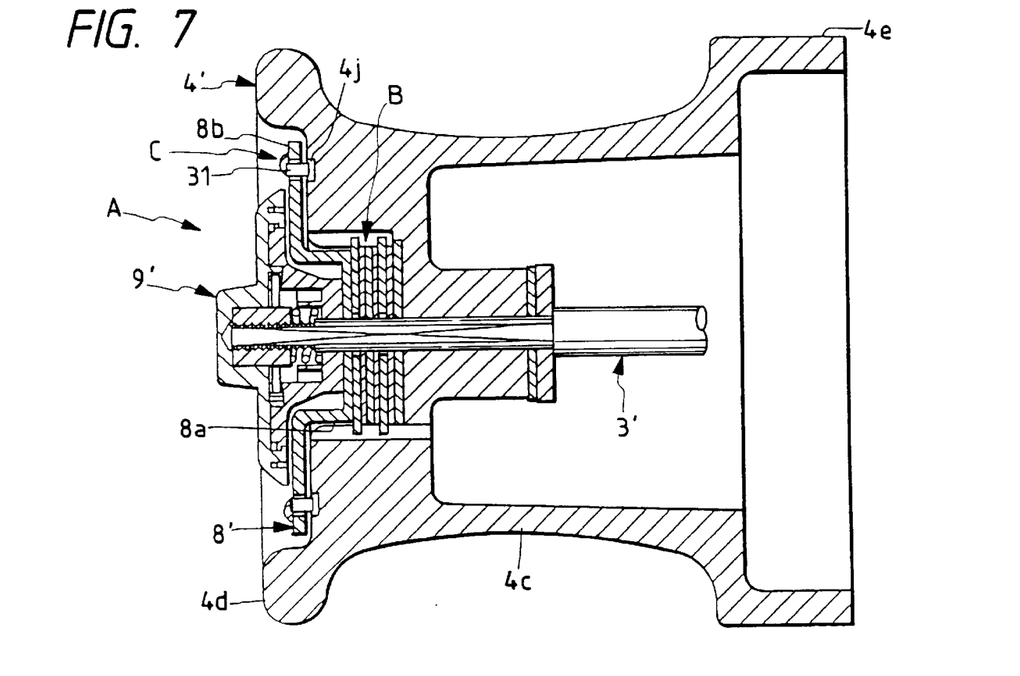
FIG. 7 is an enlarged sectional side view of the spool which is in operation.

FIGS. 5 through 7 show an example of a fishing spinning reel, which constitutes a second embodiment of the invention. FIG. 5 is an enlarged sectional side view showing essential components of the fishing spinning reel, FIG. 6 is an enlarged sectional side view of the spool of the fishing spinning reel shown in FIG. 5, and FIG. 7 is an enlarged sectional side view of the spool which is in operation.

In the fishing spinning reel, a rotary cylinder 48 is rotatably supported on a front portion of a reel body 1' through a bearing 47, and protruded forwardly.

A rotor 49 is fixedly mounted on the rotary cylinder 48 in front of a bearing 47 with a nut 50.

The base end portion of the rotary cylinder 48 is rotatably supported by a bearing portion 1m, and a drive gear 7' is engaged with a pinion 48a which is integral with the front of the base end portion; that is, the rotor 49 is so supported that it is turned in association with the rotation of a handle 27.

A shaft 3' (a spool shaft) to which a rotary body 4' (a spool) is mounted at its front end portion, is inserted into the central hole of the rotary cylinder 48 in such a manner that it is slidable back and forth. A slider 51 is mounted on the rear end portion 3e of the shaft 3' with the aid of a locking board 52.

The shaft 7d of the drive gear 7' is supported by a bearing (not shown). The shaft 7d has a polygonal central hole, with which a handle shaft 6' is engaged. A handle 27 is fixedly mounted on the handle shaft 6'. The handle 27 can be engaged with not only the right end of the shaft but also the left end.

Inside the reel body 1', an interlock gear 53 and a reverse-rotation prevent ratchet wheel 54 are fixedly mounted on the rotary cylinder 48 in front of the pinion 48a.

Furthermore, inside the reel body 1', a traverse cam 44' of a slide mechanism is supported by a bearing portion 1m and by a side board 55 mounted on the rear side of the reel body 1' in such a manner that it is in parallel with the shaft body 3' (the spool shaft).

A small gear 56 is fixedly mounted on the front end portion of a traverse cam shaft 44', and is engaged with the aforementioned interlock gear 53.

The aforementioned slider 51 is coupled to the traverse cam shaft 44' in such a manner that the pawl of an engaging piece provided on the slider 51 is engaged with the cam groove of the traverse cam shaft 44'.

A reverse-rotation preventing pawl (not shown) is provided for the reverse-rotation preventing ratchet wheel 54 in such a manner that the former is freely moved into or out of engagement with the latter.

The reverse-rotation preventing pawl (not shown) is mounted on the front portion of an operating lever 58 which is swingably coupled to the reel body 1'. An operating knob 59 is mounted on the operating lever 58 which protrudes backwardly of the reel body 1'.

The rotor 49 has a pair of bail supporting arms 49*a* and 49*b*. One bail supporting member 60 and the other bail supporting member 61 are mounted on the outsides of the front end portions of the bail supporting arms 49*a* and 49*b* of the rotor 49 with screws 62 and 63, respectively, in such a manner that they are swingable to take a line take-up position and a line let-out position.

A roller mounting section 64 of a fishing-line guide E is coupled to the one bail supporting member 60, and a line roller 65 is rotatably supported thereby.

A bail 66 is connected between the other bail supporting member 61 and the roller mounting section 64.

The rotary body 4' (the spool) has a front flange 4*d*; a fishing-line winding barrel 4*c* on which a fishing line 17 is wound; a rear cylindrical flange 4*e*; a shallow recess 4*f* in the front; another recess 4*g* in the deep of the shallow recess 4*f* which accommodates the brake boards 67 and 68 and the liner 69 of a brake member B of a brake device A, and a detection brake body 8' of alarming means C which serves also as detecting means; a through-hole 4*h* at the center with which the front end small-diameter portion 3*f* of the shaft body 3' (the spool shaft) is fitted; a cylindrical shaft 4*i* behind the center; and the uneven portion 4*j* of the alarming means C (serving also as the detecting means) in the bottom of the shallow recess 4*f*.

The recess 4*g* has two slit-shaped recesses (grooves) in the inner surface with which the protrusions of the brake board 67 are engaged.

The fishing-line winding surface a of the fishing-line winding barrel 4*c*, on which the fishing line 17 is wound, is in the form of a Japanese hand drum, being gradually larger in diameter towards both flanges 4*d* and 4*e* from the middle.

The detection brake body 8' includes a pressing portion 8*a* U-shaped in section, and a disk portion 8*b*, and is fixedly mounted on the shaft 3' (the spool shaft).

The disk portion 8*b* of the detection brake body 8' has a through-hole to which one end of the detecting piece 31 of the alarming means C (serving also as the detecting means) is secured, for instance, by spot-welding.

The other end of the detecting piece 31 is so extended as to be engageable with the uneven portion 4*j*.

The liner 69 is annular, being made of felt, cork, leather, fiber-reinforced synthetic resin or the like.

The small-diameter portion 3*f* of the shaft 3' (the spool shaft) has a rotation-preventing portion 3*g* on the outer cylindrical surface, and the front end part of the small diameter portion 3*f* is threaded as indicated at 3*h*.

The brake boards 67 and 68 and the liners 69 of the brake member B of the brake device A are mounted on the small diameter portion 3*f* of the shaft 3' (the spool shaft), and the brake board 68 is non-rotatably fitted on the rotation-preventing portion 3*g*.

When the rotary body 4' (the spool) is mounted on the small diameter portion 3*f* of the shaft 3' (the spool shaft), a friction board 70 and a brake board 71 are held between the step of the small diameter portion 3*f* and the cylindrical shaft 4*i*.

Inside the pressing portion 8*a* (U-shaped in section) of the detection brake body 8', a rotation-preventing hole portion 72*a* of the pressing portion 72 is non-rotatably fitted on the rotation-preventing portion 3*g* of the small-diameter portion 3*f* of the shaft 3' (the spool shaft), and a spring 73 is provided.

A nut 74 set in the recess 9*a* of an adjusting body 9' (the brake knob of the brake device A) adapted to adjust the frictional coupling force of the rotary body 4' (the spool) is threadably engaged with the threaded portion 3*h* of the small-diameter portion 3*f* of the shaft 3' (the spool shaft).

A pressing member 72 is provided in another recess 9*b* of the adjusting body 9' (adapted to adjust the frictional coupling force of the rotary body 4').

In the fishing spinning reel thus designed, the rotary body 4' (the spool) is frictionally coupled to the shaft 3' (the spool shaft) through the liner 69 etc. of the brake member B of the brake device A, and the drag brake force is adjusted with the adjusting body 9' (the brake knob for adjusting the frictional coupling force).

The fishing spinning reel operates as follows: When the handle 27 is turned to wind the fishing line 17 on the rotary body 4' (the spool), the drive gear 7' is turned, so that the cylindrical shaft 48 and the rotor 49 are turned in the forward direction with the aid of the pinion 48*a*.

Furthermore, the traverse cam shaft 44' is turned with the aid of the interlock gear 53 and the small gear 56, so that the slider 51, the shaft 3' (the spool shaft), and the rotary body 4' (the spool) are moved back and forth.

In the case where the fishing line 17 is wound on the rotary body 4' (the spool), the fishing line 17, being guided by the line roller 65 of the fishing-line guide section E on the one bail supporting member 60, is wound parallel on the rotary body 4' (the spool).

The brake force of the brake member B of the brake device A is adjusted as follows: When the adjusting body 9' (the brake knob) adapted to adjust the frictional coupling force of the rotary body 4 (the spool) is turned, the pressing member 72 is moved axially back and forth. When the latter 72 is moved forth, the brake boards 67 and 68 and the liner 69 of the brake member B of the brake device A, and the friction board 70 and the brake board 71 are pushed thereby, to increase the brake force.

The reverse-rotation of the rotor 49 is prevented as follows: The operating knob 59, the operating lever 58, and the reverse-rotation preventing pawl (not shown) are turned, so that the reverse-rotation preventing pawl is engaged with the reverse-rotation preventing ratchet wheel 54.

If, when the fishing operation is being carried out with the rotor 49 prevented from being turned in the reverse direction, the rotary body 4' (the spool) is turned in the reverse direction due to being pulled by the fish taking the hook, the brake force of the brake device A acts on both the rotary body 4' (the spool) and the shaft 3' (the spool shaft).

When it is required to throw the hook etc. far away while letting out the fishing line 17, the fishing rod is powerfully swung down with the bail supporting members 60 and 60 at the line let-out position.

In this operation, the fishing line 17 is unwound spirally from the line winding barrel 4*c*, and let out forwardly over the front flange 4*d*. More specifically, the fishing line is let out while being in contact with the outer periphery of the front flange 4*d*.

During winding, the fishing line 17 wound on the line winding barrel 4*c* of the rotary body 4' (the spool), being guided by the roller 65 of the fishing-line guide E provided on the one base supporting member, is wound parallel on the rotary body 4' (the spool), which is reciprocated back and forth.

The fishing line is let out while being pulled by the fish taking the hook as follows: The operating knob 59 is operated to engage the reverse-rotation preventing pawl (not shown) with the reverse-rotation preventing ratchet wheel 54; that is, the rotation of the rotor 49 is prevented. Under this condition, the rotary body 4' (the spool) is turned against the drag brake force which is adjusted by the adjusting body 9' (the brake knob) adapted to adjust the frictional coupling force of the brake member B of the brake device A, so that the fishing line is let out of the spool.

When the fishing line 17 is frequently pulled our while being tensed, the liner 69 becomes worn, as a result of which the range of adjustment is decreased. Eventually, the powder of the liner 69 thus worn sticks onto the brake surface or the drive section, thus deteriorating the drag performance. When the liner 69 is worn, the detection brake body 8' shifts axially toward the rotary body 4' (the spool); more specifically, when the liner 69 is worn out to a predetermined value, the other end portion of the detecting piece 31 of the alarming means C, which is secured to the detection brake body 8' and serves also as the detecting means, engages with the uneven portion 4j of the alarming means C which serves as the detecting means for the bottom surface of the shallow recess 4f of the rotary body 4' (the spool). Hence, as the rotary body 4' turns, a detection sound, e.g. a mechanical click sound, is produced.

When the detection sound is produced, the reel may be disassembled to replace the liner 69 with a new one. That is, the liner 69 can be replaced with a new one before the powder of the liner 69 thus worn sticks onto the brake surface or the drive section to greatly deteriorate the drag performance.

The fishing spinning reel according to the second embodiment, which is designed as described above, is advantageous as follows: If, in order to tense the fishing line 17, the latter 17 is frequently pulled, then the liner 69 of the brake member B of the brake device A becomes worn. However, with the spinning reel of the invention, when the liner 69 is worn to a predetermined value, the detection sound is produced to allow the angler to disassemble the reel and to replace the liner 69 with a new one. Hence, the worn liner can be replaced before the powder of the worn liner sticks onto the brake surface or the drive section to greatly deteriorate the drag performance of the fishing reel.

Third Embodiment

Figure 8:
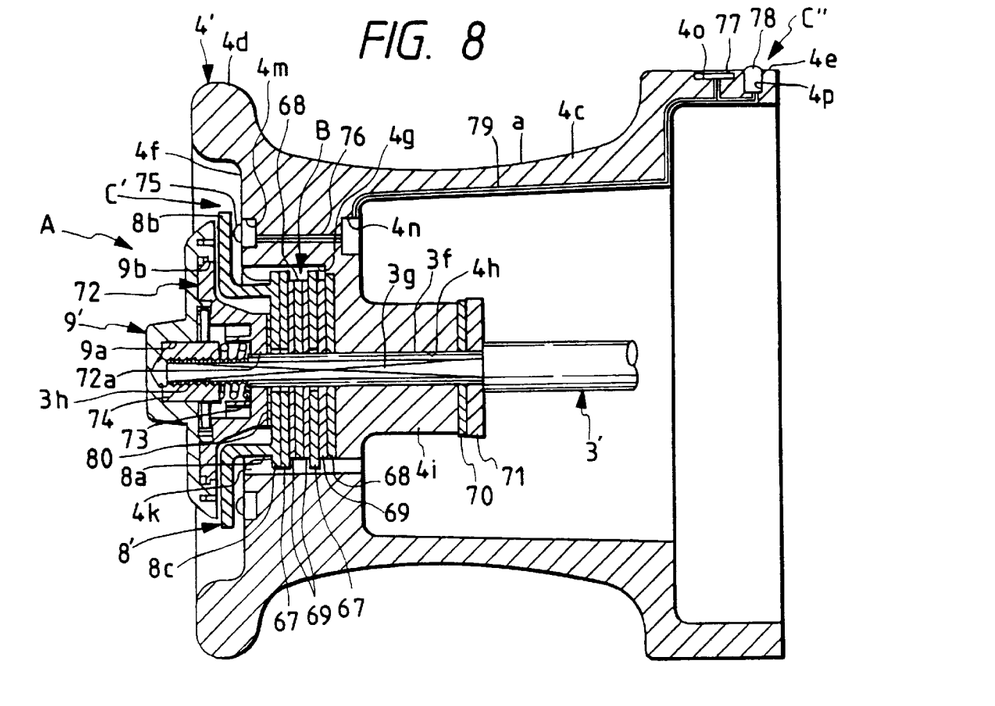
FIG. 8 is an enlarged sectional side view showing the spool of another example of the fishing spinning reel, which constitutes a third embodiment of the invention.
Figure 9:
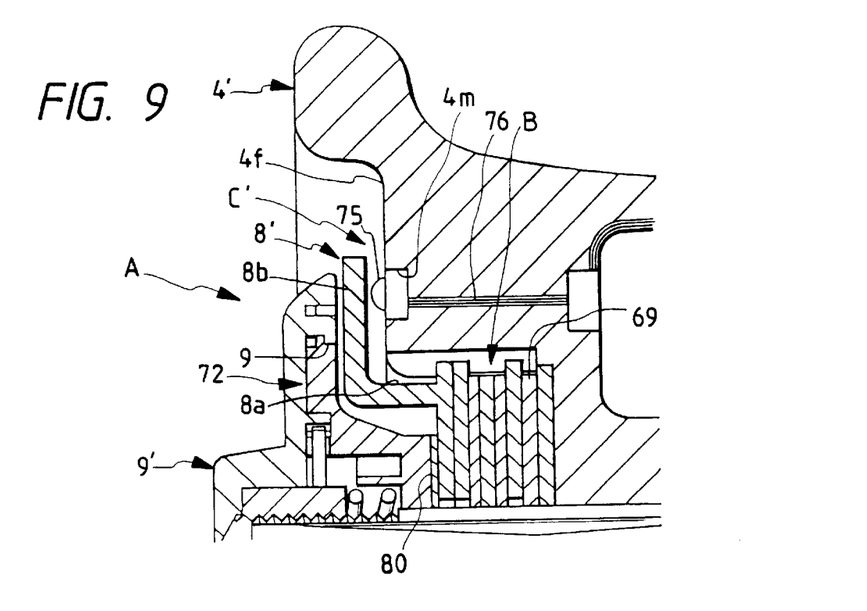
FIG. 9 is an enlarged sectional side view of the front part of the spool shown in FIG. 8.
Figure 10:
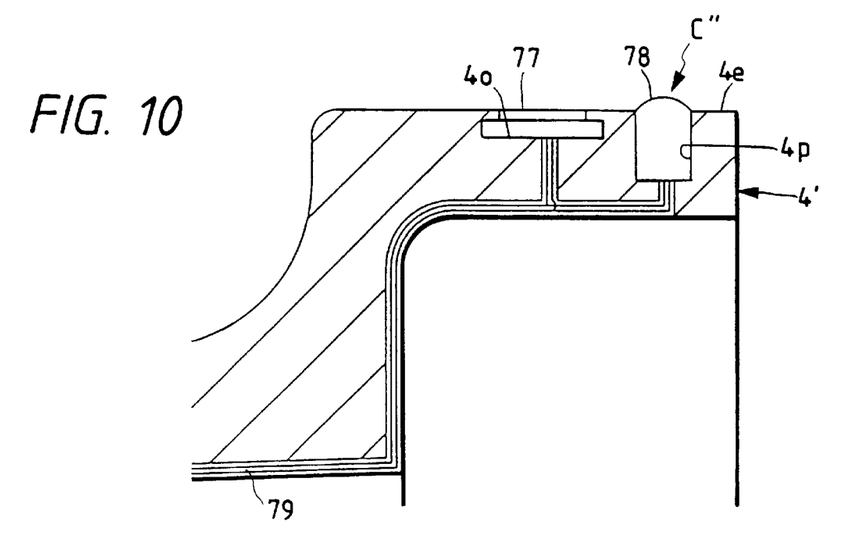
FIG. 10 is an enlarged sectional side view showing the rear part of the spool shown in FIG. 8.
Figure 11:
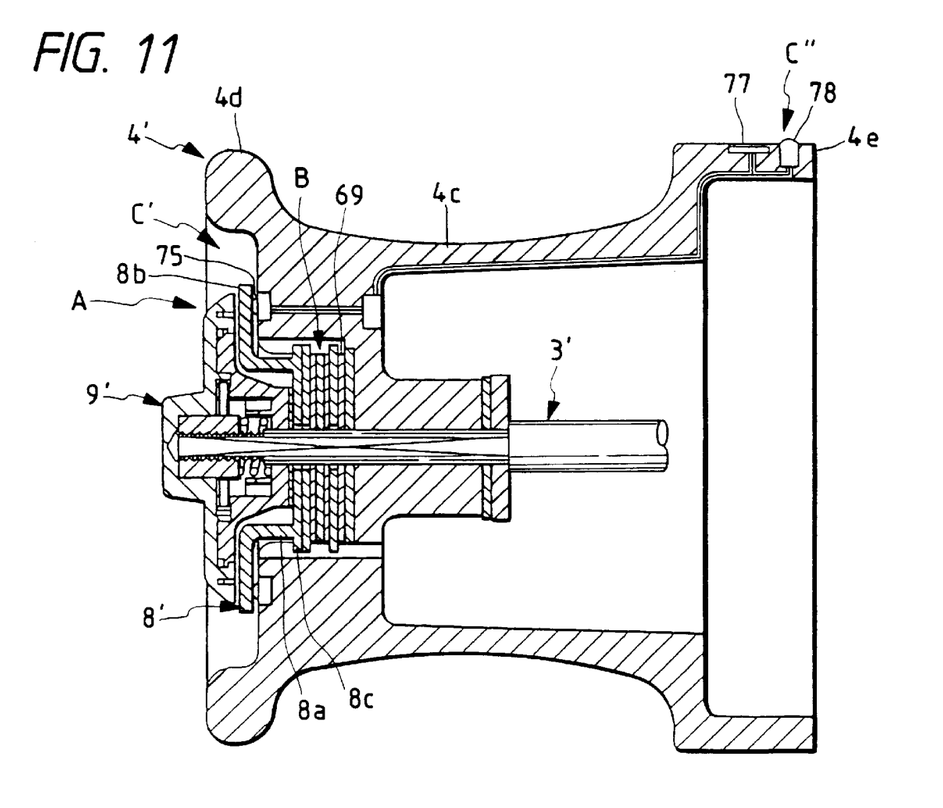
FIG. 11 is an enlarged sectional side view of the spool shown in FIG. 8 which is in operation.

FIGS. 8 through 11 show another example of the fishing spinning reel, which constitutes a third embodiment of the invention. FIG. 8 is an enlarged sectional side view showing the spool of the fishing spinning reel, FIG. 9 is an enlarged sectional side view of the front part of the spool shown in FIG. 8, FIG. 10 is an enlarged sectional side view showing the rear part of the spool shown in FIG. 8, and FIG. 11 is an enlarged sectional side view of the spool which is in operation.

A rotary body 4', which is the spool in the third embodiment, comprises: a front flange 4d; a line winding barrel 4c on which a fishing line 17 is wound; a rear cylindrical flange 4e, a front shallow recess 4f; a recess 4g in the deep of the recess 4f in which the brake boards 67 and 68 and the liners of the brake member B of a brake device A, and the detection brake body 8' of detecting means C' are accommodated; in the central portion, a through-hole 4h in which the small-diameter end portion 3f of a shaft 3' (a spool shaft) is fitted; a cylindrical shaft 4i behind the central portion; a recess 4m in the bottom of the shallow recess 4f in which a switch 75 of the detecting means C' is accommodated; a recess 4n in which a battery (not shown) and a control circuit (not shown) are accommodated; a through-hole into which a lead wire 76 is inserted which connects the switch 75, the battery and the control circuit to one another; a recess 4o in which a loudspeaker 77 of alarming means C" is mounted; a recess 4p in which the light emitting element 78 of the alarming means C" is set; and a groove and a through-hole in which lead wires 79 are accommodated which connect the battery (not shown), the control circuit (not shown), the loudspeaker 77, and the light emitting element 78 to one another.

The recess 4g has two stripe-shaped recesses 4k with which the protrusions of the brake board 67 are engaged.

The detection brake body 8' of the detecting means C' includes a pressing portion 8a U-shaped in section, and a disk-shaped portion 8b. The pressing portion 8a has protrusions 8c.

The protrusions 8c are engaged with the two stripe-shaped recesses 4k, so that the detection brake body 8' is turned together with the rotary body 4' (the spool).

Inside the pressing portion 8a (U-shaped in section) of the detection brake body 8' mounted on the rotation preventing portion 3g of the small-diameter end portion 3f of the shaft 3' (the spool shaft), a liner washer 80 and a rotation-preventing hole 72a are provided, and a spring 73 is provided.

Similarly as in the case of the second embodiment, the detection brake body 8' may be non-rotatably fitted on the shaft 3' (the spool shaft).

The other arrangements are substantially the same as those of the above-described second embodiment.

The third embodiment operates as follows: When the fishing line 17 is frequently pulled while being tensed during fishing, the liner 69 of the brake member B of the brake device A becomes worn, so that the detection brake body 8' of the detecting means shifts axially forwardly over time. When the liner 69 is worn to a predetermined value, the switch 75 of the detecting means C' is turned on by the disk-shaped portion 8b, as a result of which the control circuit (not shown) in the recess 4n operates to cause the loudspeaker 77 of the alarming means C" to produce a warning sound and to cause the light emitting element 78 to emit a light beam.

The technical concept of the third embodiment may be applied to the first embodiment.

Fourth Embodiment

Figure 12:
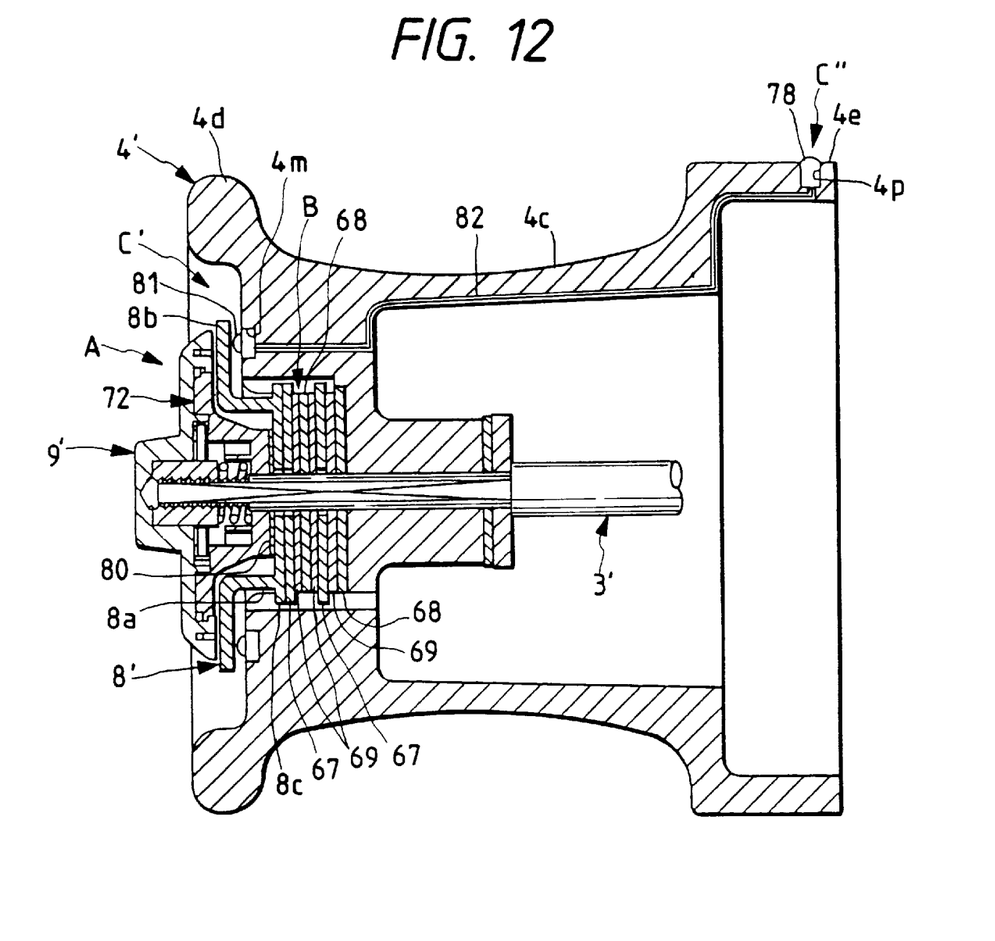
FIG. 12 is an enlarged sectional side view of the spool in another example of the fishing spinning reel, which constitutes a fourth embodiment of the invention.
Figure 13:
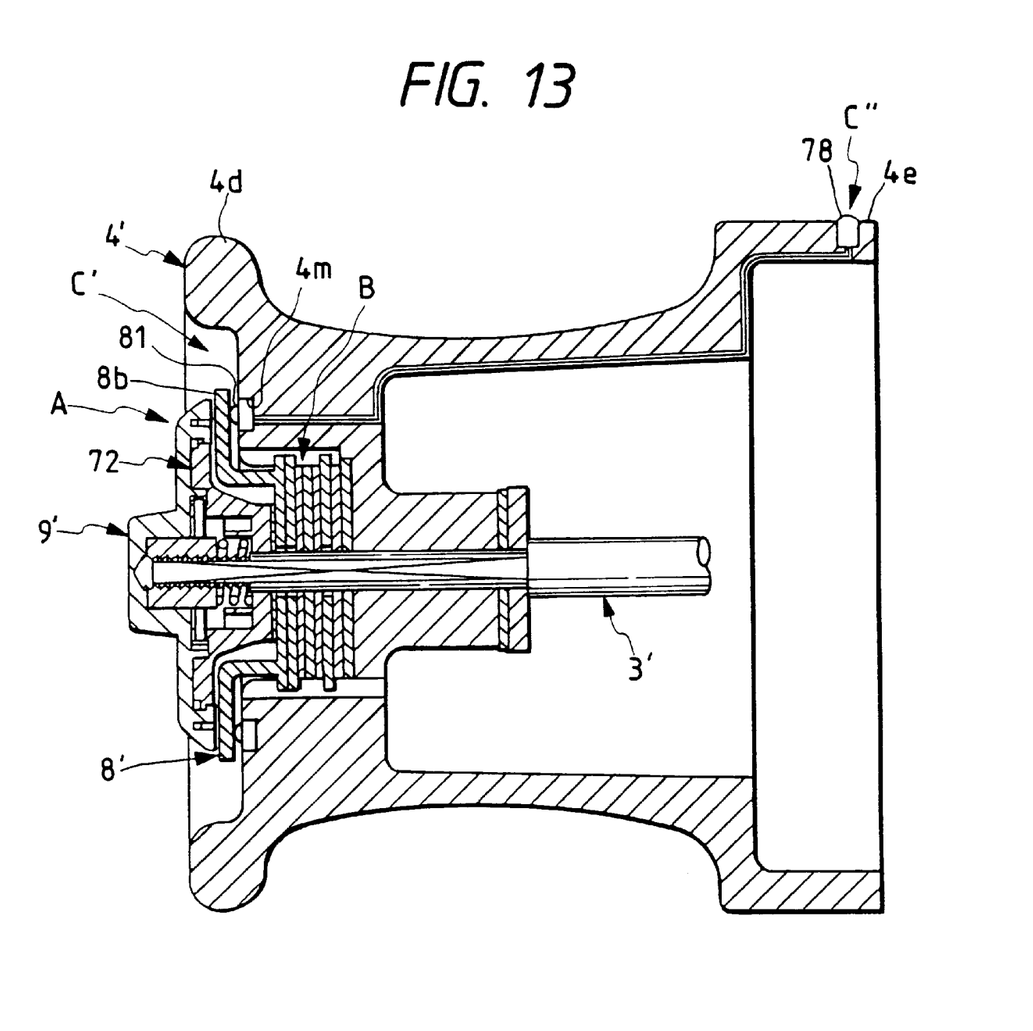
FIG. 13 is an enlarged section side view of the spool shown in FIG. 12 which is in operation.

FIGS. 12 and 13 show another example of the fishing spinning reel, which constitutes a fourth embodiment of the invention. FIG. 12 is an enlarged sectional side view of the spool in the fishing spinning reel, and FIG. 13 is an enlarged section side view of the spool which is in operation.

In the fourth embodiment, a piezo-electric element 81 of detecting means C is fixedly set in a recess 4m of a rotary body 4' (a spool), and the piezo-electric element 81 is connected through a lead wire 82 to the light emitting element 78 of alarming means C".

The other arrangements are substantially equal to those of the above-described third embodiment.

The fourth embodiment operates as follows: When the fishing line 17 is frequently pulled out while being tensed during fishing, the liner 69 of the brake member B of the brake device A becomes worn, so that the detection brake body 8' of the detecting means moves axially forwardly over time. Hence, when the liner 69 is worn to a predetermined value, the piezo-electric element 81 of the detecting means C' is depressed by the disk-shaped portion 8b to generate voltage, so that the light emitting element 78 of the alarming means C" emits a light beam.

Fifth Embodiment

Figure 14:
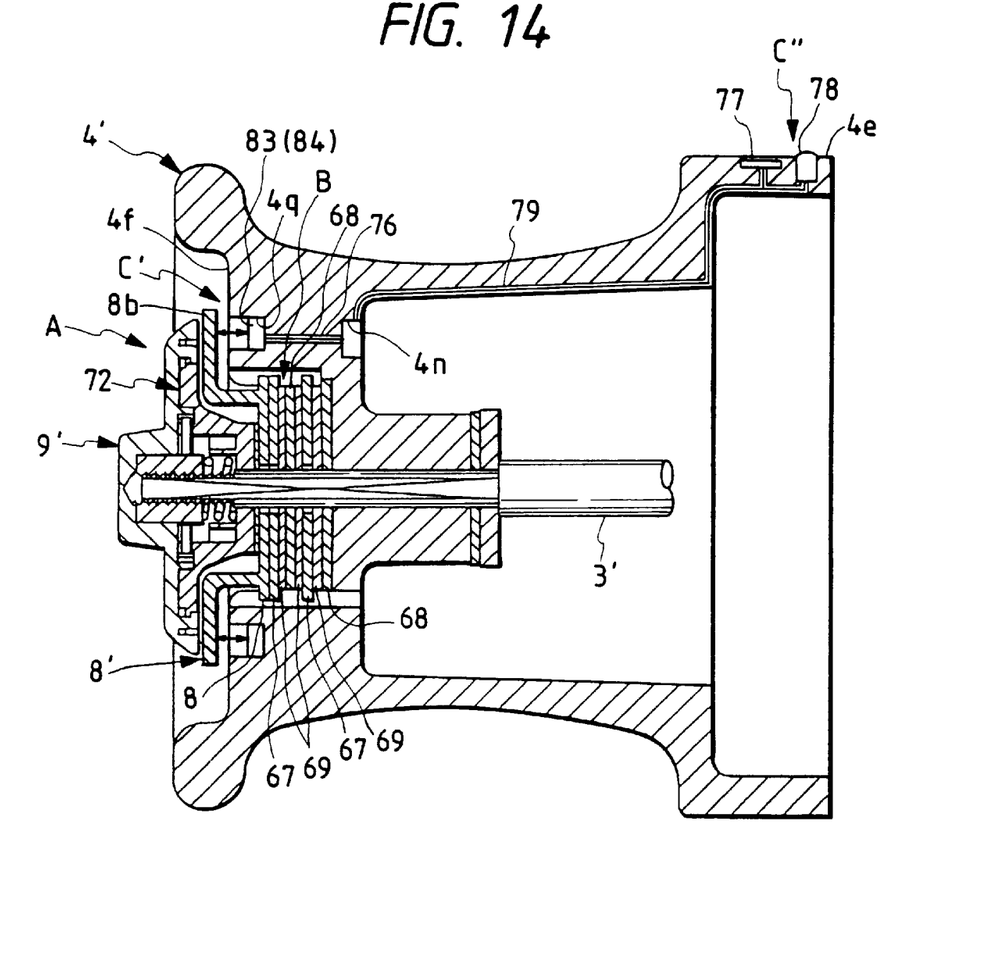
FIG. 14 is an enlarged sectional side view of the spool in another example of the fishing spinning reel, which constitutes a fifth embodiment of the invention.
Figure 15:
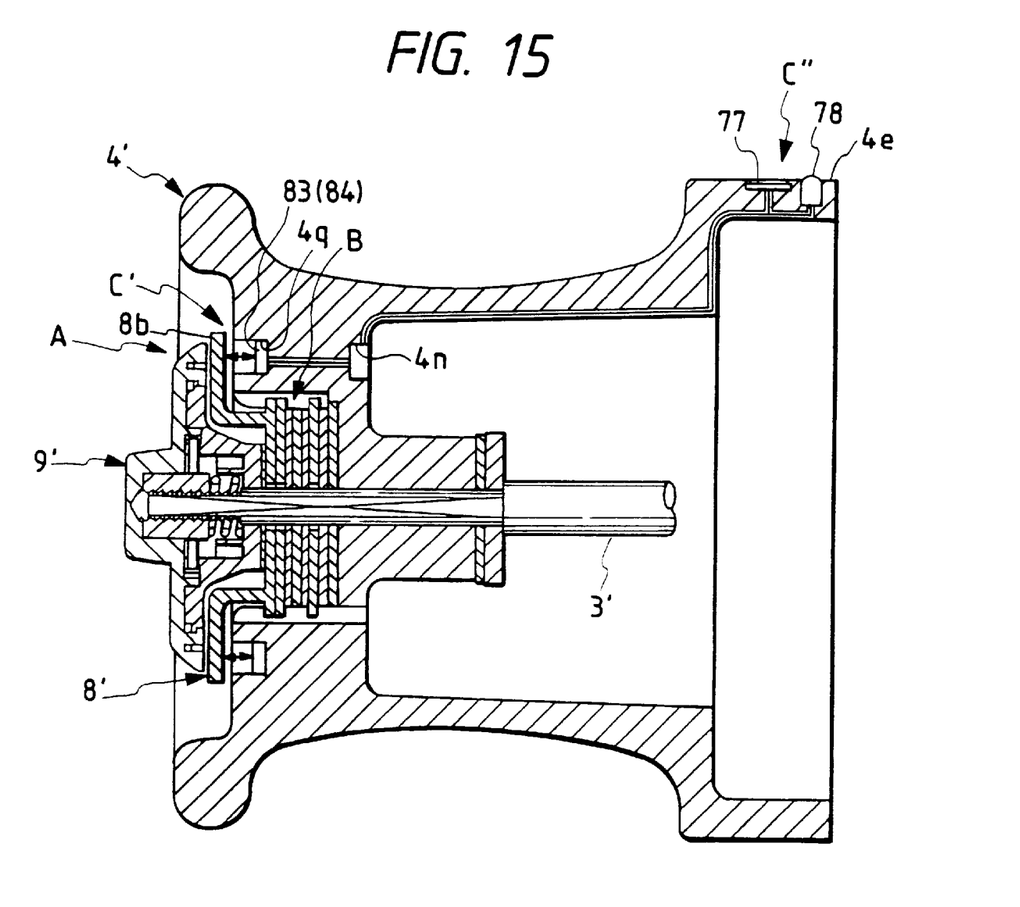
FIG. 15 is an enlarged section side view of the spool shown in FIG. 14 which is in operation.

FIGS. 14 and 15 shows another example of the fishing spinning reel, which constitutes a fifth embodiment of the invention. FIG. 14 is an enlarged sectional side view of the spool in the fishing spinning reel, and FIG. 15 is an enlarged section side view of the spool which is in operation.

In the fifth embodiment, a rotary body 4', which is a spool, has a shallow recess 4f in the front. The shallow recess 4f has a recess 4q, in which an ultrasonic signal generating unit 83 and an ultrasonic signal receiving unit 84 of detecting means C' are fixedly set.

The other arrangements are substantially the same as equal to those of the above-described third embodiment.

The fourth embodiment operates as follows: If the operation that the fishing line 17 is pulled out while being tensed is frequently carried out during fishing, the liner 69 of the brake member B of the brake device A becomes worn, so that the detection brake body 8' of the detecting means shifts axially forwardly over time. When the liner 69 is worn to a predetermined value, the ultrasonic signal generated by the ultrasonic signal generating unit is reflected by the disk-shaped portion 8b, thus being transmitted to the ultrasonic signal receiving unit 84. As a result, with the aid of the control circuit (not shown) in the recess 4n the loudspeaker 77 of the alarming means produces sound, and the light emitting element 78 emits light.

The fishing reel of the invention is designed as described above. Hence, as the fishing line is frequently pulled while being tensed, the liner of the brake member in the brake device becomes worn. When the liner is worn to a certain value, the detecting means detects the wear to cause the alarming means to output detection signals e.g. sound or light, to allow the angler to disassemble the reel to replace the worn liner with a new one. Hence, the worn liner can be replaced before the powder of the worn liner sticks onto the brake surface or the drive section which deteriorates the drag performance of the reel. Thus, the fishing reel of the invention should be highly appreciated in practical use.

What is claimed is:

1. A fishing reel comprising:
   a rotary body rotatably mounted on a shaft body and turnable as a fishing line is let out;
   a brake device for frictionally coupling said rotary body to said shaft body so as to permit rotation of said rotary body against a constant frictional coupling force, said brake device having an adjusting body for adjusting the frictional coupling force, and a liner for producing the frictional force, said brake device normally fixing said rotary body to said shaft body through said constant frictional force;
   detecting means for detecting whether said liner is worn to a predetermined value; and
   alarm means for providing an alarm whenever said rotary body is rotating relative to said shaft body against said constant frictional force, if said detecting means detects that said liner is worn to the predetermined value.

2. A fishing reel according to claim 1, wherein a detection brake body is provided so that said liner is interposed between said detection brake body and said rotary body, and a portion of said detection brake body is brought into contact with said rotary body to generate a sound when said liner is worn to the predetermined value.

3. A fishing reel according to claim 2, wherein said portion of said detection brake body contacting with said rotary body generates a mechanical click sound when said rotary body is rotated.

4. A fishing reel according to claim 2, wherein an electric signal is provided to generate a sound from a loudspeaker when said portion of said detection brake body is brought into contact with said rotary body.

5. A fishing reel according to claim 2, wherein an electric signal is provided to emit a light from a light emitting element.

6. A fishing reel according to claim 1, wherein a detection brake body is provided so that said liner is interposed between said detection brake body and said rotary body and that a distance between said detection brake body and said rotary body varies depending on an amount of wear of said liner, said detecting means detects whether the distance becomes the predetermined value, and said alarm means provides an alarm if said detecting means detects that the distance becomes the predetermined value.

7. A fishing reel according to claim 6, wherein a portion of said detection brake body is brought into contact with said rotary body when the distance becomes the predetermined value.

8. A fishing reel according to claim 6, wherein said detecting means includes an ultrasonic signal generating and receiving unit.

9. A fishing reel comprising:
   a rotary body turnable as a fishing line is let out;
   a brake device for frictionally coupling said rotary body to a shaft body so as to permit rotation of said rotary body against a frictional coupling force, said brake device having an adjusting body for adjusting the frictional coupling force, and a liner for producing the frictional force;
   detecting means for detecting whether said liner is worn to a predetermined value; and
   alarm means for providing an alarm if said detecting means detects that said liner is worn to the predetermined value;
   wherein said rotary body is a spool for supporting a wound portion of the fishing line; and
   wherein at least a portion of said detecting means is provided on said spool.

10. A fishing reel according to claim 9, wherein a detection brake body is provided so that said liner is interposed between said detection brake body and said rotary body, and a portion of said detection brake body is brought into contact with said rotary body to generate a sound when said liner is worn to the predetermined value.

11. A fishing reel according to claim 10, wherein said portion of said detection brake body contacting with said rotary body generates a mechanical click sound when said rotary body is rotated.

12. A fishing reel according to claim 10, wherein an electric signal is provided to generate a sound from a loudspeaker when said portion of said detection brake body is brought into contact with said rotary body.

13. A fishing reel according to claim 10, wherein an electric signal is provided to emit a light from a light emitting element.

14. A fishing reel according to claim 9, wherein a detection brake body is provided so that said liner is interposed between said detection brake body and said rotary body and that a distance between said detection brake body and said rotary body varies depending on an amount of wear of said liner, said detecting means detects whether the distance becomes the predetermined value, and said alarm means provides an alarm if said detecting means detects that the distance becomes the predetermined value.

15. A fishing reel according to claim 14, wherein a portion of said detection brake body is brought into contact with said rotary body when the distance becomes the predetermined value.

16. A fishing reel according to claim 14, wherein said detecting means includes an ultrasonic signal generating and receiving unit.

17. A fishing reel according to claim 9, wherein:

said brake device comprises a brake body mounted coaxially with said spool; and said detecting means comprises a first portion arranged on said brake body and a second portion arranged on said spool.

18. A fishing reel according to claim 17, wherein said first portion comprises a detecting piece extending axially towards said spool, and said second portion comprises an uneven portion arranged facing said detecting piece on a side wall of said spool.

19. A fishing reel according to claim 17, wherein said first portion comprises an arm of said brake body, and said second portion comprises a switch mechanism arranged facing said arm on a side wall of said spool and arranged to switch from a first state to a second state when a distance between said arm and said switch mechanism corresponds to the predetermined value.

* * * * *